(12) United States Patent
Turner

(10) Patent No.: US 10,536,674 B2
(45) Date of Patent: Jan. 14, 2020

(54) LOW EARTH ORBITING SPACECRAFT WITH A DUAL-USE DIRECTIONAL ANTENNA

(71) Applicant: Space Systems/Loral, LLC, Palo Alto, CA (US)

(72) Inventor: Andrew E. Turner, Mountain View, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 32 days.

(21) Appl. No.: 15/900,653

(22) Filed: Feb. 20, 2018

(65) Prior Publication Data

US 2018/0288374 A1 Oct. 4, 2018

Related U.S. Application Data

(60) Provisional application No. 62/480,160, filed on Mar. 31, 2017.

(51) Int. Cl.
*H04N 7/18* (2006.01)
*H04N 7/20* (2006.01)
(Continued)

(52) U.S. Cl.
CPC .............. *H04N 7/20* (2013.01); *H01Q 1/125* (2013.01); *H01Q 3/08* (2013.01);
(Continued)

(58) Field of Classification Search
CPC combination set(s) only.
See application file for complete search history.

(56) References Cited

U.S. PATENT DOCUMENTS

| 9,889,950 B2 | 2/2018 | Turner |
| 2005/0143005 A1 | 6/2005 | Moore, III |

(Continued)

FOREIGN PATENT DOCUMENTS

| DE | 10 2008 006432 A 1 | 8/2009 |
| EP | 0 635 698 A1 | 1/1995 |
| WO | WO 2017/023621 A 1 | 2/2017 |

OTHER PUBLICATIONS

Extended European Search Report dated Aug. 29, 2018 in EP Application No. 18164338.8.
(Continued)

*Primary Examiner* — Sath V Perungavoor
*Assistant Examiner* — Peet Dhillon
(74) *Attorney, Agent, or Firm* — Weaver Austin Villeneuve & Sampson LLP

(57) ABSTRACT

A low earth orbiting spacecraft (LEO spacecraft) operable in a first earth orbit includes a main body, a data collection payload, and a first directional antenna, each of the data collection payload and the first directional antenna being coupled with the main body. During a first period of time, the main body is oriented such that the data collection payload views a region of interest on the earth. During a second period of time, the main body and the first directional antenna are oriented such that the first directional antenna is directed toward a first ground station. During a third period of time, the main body and the first directional antenna are oriented such that the first directional antenna is directed toward a second spacecraft operating in a second orbit.

18 Claims, 4 Drawing Sheets

(51) Int. Cl.
  *H04B 7/185* (2006.01)
  *H01Q 1/12* (2006.01)
  *H01Q 3/08* (2006.01)
  *H04B 7/19* (2006.01)
  *H04B 7/195* (2006.01)

(52) U.S. Cl.
  CPC .......... *H04B 7/18521* (2013.01); *H04B 7/19* (2013.01); *H04B 7/195* (2013.01)

(56) References Cited

U.S. PATENT DOCUMENTS

| | | |
|---|---|---|
| 2007/0241244 A1 | 10/2007 | Hozouri |
| 2012/0184208 A1 | 7/2012 | Renouard et al. |
| 2014/0105100 A1 | 4/2014 | Trone et al. |
| 2015/0318916 A1* | 11/2015 | Gopal ................ H04B 7/18519 455/13.1 |
| 2016/0365630 A1 | 12/2016 | Rao et al. |
| 2017/0034250 A1 | 2/2017 | Sobhani et al. |
| 2017/0070939 A1 | 3/2017 | Chong et al. |

OTHER PUBLICATIONS

National Aeronautics & Space Administration, "Ku-Band," Human Space Flight, Apr. 7, 2002, 3 pages. https://spaceflight.nasa.gov/shuttle/reference/shutref/orbiter/comm/orbcomm/kuband.html.

National Aeronautics & Space Administration, "TDRS History," Tracking & Data Relay Satellite, Exploration & Space Communications, 2 pages. https://esc.gsfc.nasa.gov/node/174.

Hauschildt et al., "European Data Relay System—One year to go!," European Space Agency ESA-ESTEC Noordwijk, The Netherlands, International Conference on Space Optical Systems and Applications (ICSOS) 2014, S1-3, Kobe, Japan, May 7-9, 2014, 5 pages. http://icsos2014.nict.go.jp/contents/pdf/S1-3.pdf.

* cited by examiner

LOW EARTH ORBITING SPACECRAFT WITH A DUAL-USE DIRECTIONAL ANTENNA

CROSS-REFERENCE TO RELATED APPLICATIONS

This disclosure claims priority to U.S. Provisional Patent Application No. 62/480,160, filed Mar. 31, 2017, entitled "DOWNLINK USED AS A CROSSLINK", and assigned to the assignee hereof, the disclosure of which is hereby incorporated by reference in its entirety into this patent application for all purposes.

TECHNICAL FIELD

This invention relates generally to imaging and communications satellites, and more particularly to improved techniques for providing low-latency transmission of imaging data from a first satellite in a low earth orbit to a ground station via a second satellite in a higher earth orbit, using a downlink antenna on the first spacecraft to establish an inter-satellite link ("crosslink") with the second satellite.

BACKGROUND

Spacecraft in low earth orbit or other low orbits (LEO spacecraft) carry antennas to downlink observational data at a high rate. The data can be downlinked in real time as the observations are made when the LEO spacecraft is in view of a ground station. During periods of time when the LEO spacecraft is not in view of a ground station, the data may be stored aboard the spacecraft to be sent to a ground station at a later time when the LEO spacecraft comes into view of the ground station. For a practical number and geographic distribution of ground stations, in the absence of the presently disclosed techniques, low-latency access to the observational data is impossible for significant portions of the LEO spacecraft's time in orbit.

SUMMARY

According to some implementations, a low earth orbiting spacecraft (LEO spacecraft) operable in a first earth orbit, includes a main body, a data collection payload, and a first directional antenna, each of the data collection payload and the first directional antenna being coupled with the main body. During a first period of time, the main body is oriented such that the data collection payload views a region of interest on the earth. During a second period of time, the main body and the first directional antenna are oriented such that the first directional antenna is directed toward a first ground station. During a third period of time, the main body and the first directional antenna are oriented such that the first directional antenna is directed toward a second spacecraft operating in a second orbit.

In some examples, the first directional antenna may be configured to establish a downlink with the first ground station during at least a portion of the second period of time and may be configured to establish a crosslink with the second spacecraft during at least a portion of the third period of time. In some examples, the LEO spacecraft may be configured to transmit data collected by the data collection payload by way of the crosslink to the second spacecraft. In some examples, data collected by the data collection payload may be forwarded to a second ground station by way of the crosslink to the second spacecraft and a downlink from the second spacecraft to the second ground station.

In some examples, at least a portion of the second period of time may overlap with at least a portion of the first period of time.

In some examples, the third period of time may overlap no portion of the first period of time and no portion of the second period of time.

In some examples, the first directional antenna may be a steerable dish antenna. In some examples, an orientation of the steerable dish antenna with respect to the main body may be controlled by a gimbal rotatable about an X axis and a Y axis and the main body may be oriented to avoid co-linearity between a direction toward the second spacecraft and each of the X axis and the Y axis.

In some examples, the second orbit may be substantially higher than the first earth orbit.

In some examples, the second orbit may be a geosynchronous orbit.

According to some implementations, a method, includes: collecting, during a first period of time, observational data from a region of interest on earth, using a data collection payload disposed on a low earth orbiting spacecraft (LEO spacecraft) operating in a first earth orbit, the LEO spacecraft including a main body, the data collection payload, and a first directional antenna, each of the data collection payload and the first directional antenna being coupled with the main body; orienting, during a second period of time, one or both of the main body and the first directional antenna such that the first directional antenna is directed toward a first ground station; and orienting, during a third period of time, one or both of the main body and the first directional antenna such that the first directional antenna is directed toward a second spacecraft operating in a second orbit.

In some examples, the method may further include establishing, with the first directional antenna, a downlink with the first ground station during at least a portion of the second period of time, and establishing, with the first directional antenna, a crosslink with the second spacecraft during at least a portion of the third period of time. In some examples, the method may further include transmitting data collected by the data collection payload by way of the crosslink to the second spacecraft. In some examples, data collected by the data collection payload may be forwarded to a second ground station by way of the crosslink to the second spacecraft and a downlink from the second spacecraft to the second ground station.

In some examples, at least a portion of the second period of time may overlap with at least a portion of the first period of time.

In some examples, the third period of time may overlap no portion of the first period of time and no portion of the second period of time.

In some examples, the first directional antenna may be a steerable dish antenna. In some examples, an orientation of the steerable dish antenna with respect to the main body may be controlled by a gimbal rotatable about an X axis and a Y axis and the main body may be oriented to avoid co-linearity between a direction toward the second spacecraft and each of the X axis and the Y axis.

In some examples, the second orbit may be substantially higher than the first earth orbit.

In some examples, the second orbit may be a geosynchronous orbit.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which.

DETAILED DESCRIPTION

Figure 1:
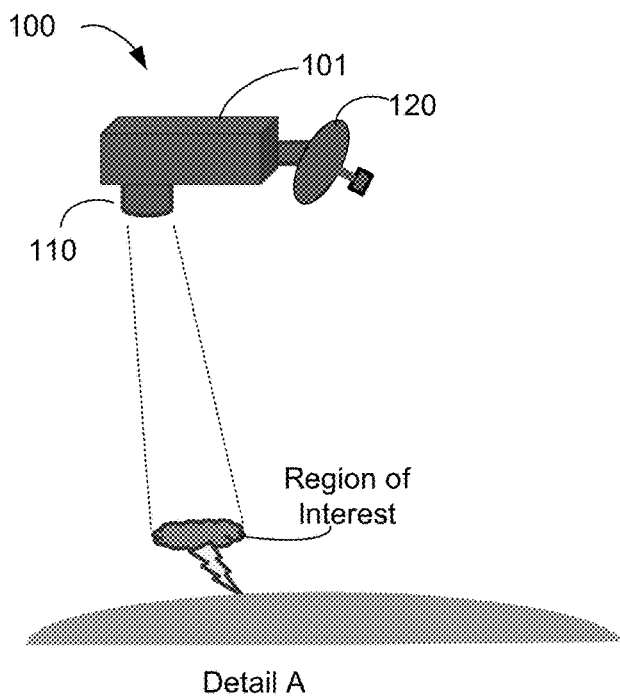
FIG. 1 illustrates an example of a LEO spacecraft, according to an implementation.
Figure 1:
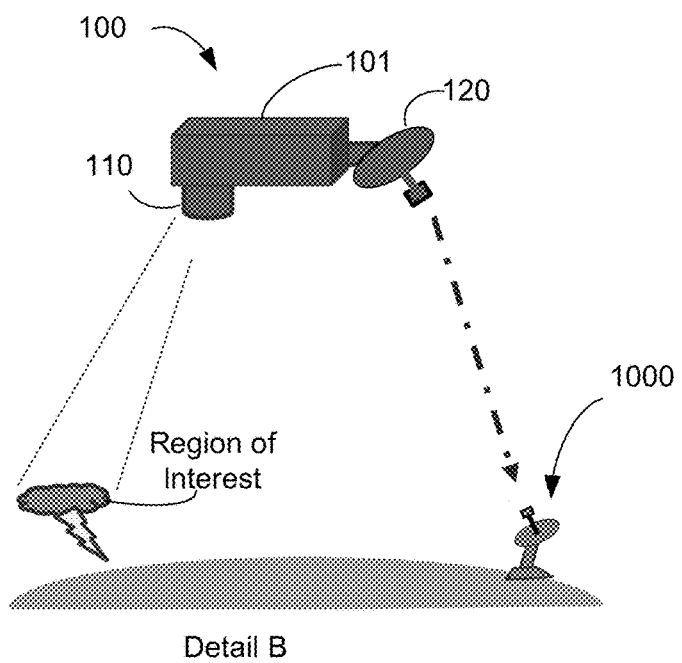

The present inventor has appreciated that low-latency transmission of imaging data from a first satellite in low earth orbit (LEO) to a ground station may be achieved by establishing a cross-link with a second orbiting satellite. Advantageously, the cross-link may be established using a first antenna during certain portions of the orbit, the first antenna also being used during other portions of the orbit to establish a downlink.

In some implementations, the LEO spacecraft may be "agile" by which is meant that the LEO spacecraft is configured to be capable of repeated rotations of its body through a wide range of angle and/or to include a downlink antenna that can traverse a wide range of angle using gimbals. It will be appreciated that the orientation of the LEO spacecraft may be tightly constrained, operationally, during portions of its orbit associated with data collection periods from regions of interest on the surface of the earth, whether the data collection involves imaging, receiving radio signals, and/or scanning using radar or other methods. During other portions of its orbit, the LEO spacecraft may be above regions of the earth where no data is intended to be collected. During these portions of the orbit, the agility of the LEO spacecraft and/or its downlink antenna may be employed to point the antenna toward a second spacecraft.

In some instances, the second spacecraft may in a substantially higher orbit than the low earth orbit. The second spacecraft may be disposed in a geosynchronous (GEO) orbit, for example. In some instances, the second spacecraft may be a commercial GEO spacecraft and an economical downlink service may be provided via the GEO spacecraft to a station on the ground served by the GEO spacecraft. As a result, the workload of ground stations associated with the data-collecting LEO spacecraft may be reduced. Moreover, collected data may be more quickly available to a user since there may otherwise be a significant delay before the LEO spacecraft comes into view of a ground station with which the LEO spacecraft could establish a direct downlink.

It is contemplated that, in at least some instances, a LEO spacecraft benefiting from the presently disclosed techniques may be required by its mission to rotate through large angles (i.e., to be agile) in order for its data collection instruments to be directed towards points on the ground not necessarily at nadir. Moreover, the agile LEO spacecraft may already include a downlink antenna capable of pointing substantially away from nadir even when the instrument is nadir-directed. For example, a pointing angle with respect to nadir-pointing may be comparable to the apparent half-width of earth, or about 60 degrees for a useful orbital altitude on the order of 600 km. Likewise, the data collection payloads may be required to be capable of pointing away from the nadir to observe points on the surface of the earth near the limb, which may entail a rotation of the spacecraft body by about 60 degrees.

Since the total width of the earth as viewed from a 600 km orbit altitude is only about 60 degrees, this would enable the downlink antenna to be raised well above the horizon of the earth. In some implementations for example, the spacecraft may be configured to point the downlink antenna within about 60 degrees of the zenith, or about 30 degrees above the local horizon. As a result, the LEO spacecraft may establish a cross-link with a second spacecraft (e.g., a geosynchronous spacecraft) that is at an elevation of 30 degrees. The second spacecraft may receive data over the cross-link and retransmit the data to the ground. The cross-link may also be operable in reverse, that is, commands or data from a mission control center to the LEO spacecraft may be uplinked to the second spacecraft, and then forwarded over the cross-link to the LEO spacecraft.

FIG. 1 illustrates an example of a LEO spacecraft, according to an implementation. The LEO spacecraft 100 includes a main body 101 with which are coupled a data collection payload 110 and a directional antenna 120. The directional antenna 120 may be a steerable dish antenna and may be configured to establish a downlink with a ground station (not illustrated) or a cross-link with a second spacecraft (not illustrated).

Referring first to Detail A, the main body 101 of the LEO spacecraft 100 may be oriented, during a first period of time, such that the data collection payload 110 views a region of interest on the earth. The region of interest may be, as suggested by Detail A, related to a meteorological phenomenon. Alternatively or in addition, the region of interest may be related to other natural phenomenon or to a human-caused phenomenon. During a first period of time in which the main body 101 is oriented such that the data collection payload 110 views the region of interest, the directional antenna 120 may or may not be directed toward a ground station. For the example illustrated in Detail A, a ground station is not within view of the directional antenna 120. Accordingly, data collected in the example of Detail A, must be stored on the spacecraft 100 until a downlink to a ground station can be established.

It will be appreciated that the LEO spacecraft 110 will have a significant velocity along an orbit ground track. Accordingly, an angular orientation of the region of interest with respect to the LEO spacecraft 100 may be continually changing at a substantial rate. One or both of the main body 101 and the data collection payload 110 may be actively steered such that the data collection payload 110 maintains a persistent view of the region of interest.

Referring now to Detail B, an example is illustrated in which the data collection payload 110 views the region of interest, while the directional antenna 120 is directed toward a first ground station 1000. For the geometry illustrated in Detail B, simultaneous collection of data by the data collection payload 110 and down linking the collected data by way of the directional antenna 120 to the ground station 1000 is possible. It will be appreciated that the geometry illustrated in Detail B permits low latency transfer of collected data to the user on the ground. But, as noted above, for a practical number and geographic distribution of ground stations, the illustrated geometry will be available, if at all, for a relatively small portion of the LEO spacecraft's orbital period.

Figure 2:
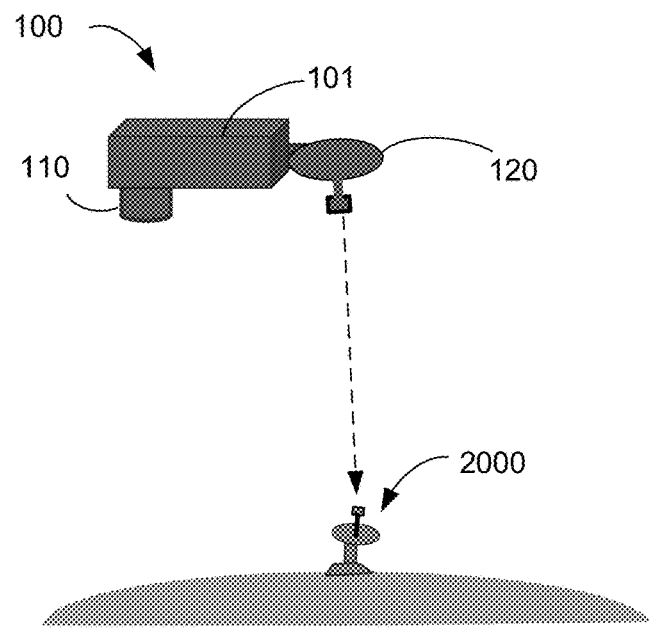
FIG. 2 illustrates an example in which a directional antenna is directed toward a ground station a data collection payload is not within view of a region of interest, according to an implementation.

Referring now to FIG. 2, an example is illustrated in which the directional antenna 120 is directed toward a ground station 2000 and the data collection payload is not within view of the region of interest. In the illustrated example, the directional antenna 120 may be configured to establish a downlink with the ground station 2000. As a result, collected data stored on the spacecraft 100 may be downlinked to a user on the ground by way of the ground station 2000. It will be appreciated that the collected data may be received by the user only after a substantial delay (of one or more hours) as the spacecraft 100 travels from a position where it is within view of the region of interest to a position where it is within view of the ground station 2000.

Figure 3:
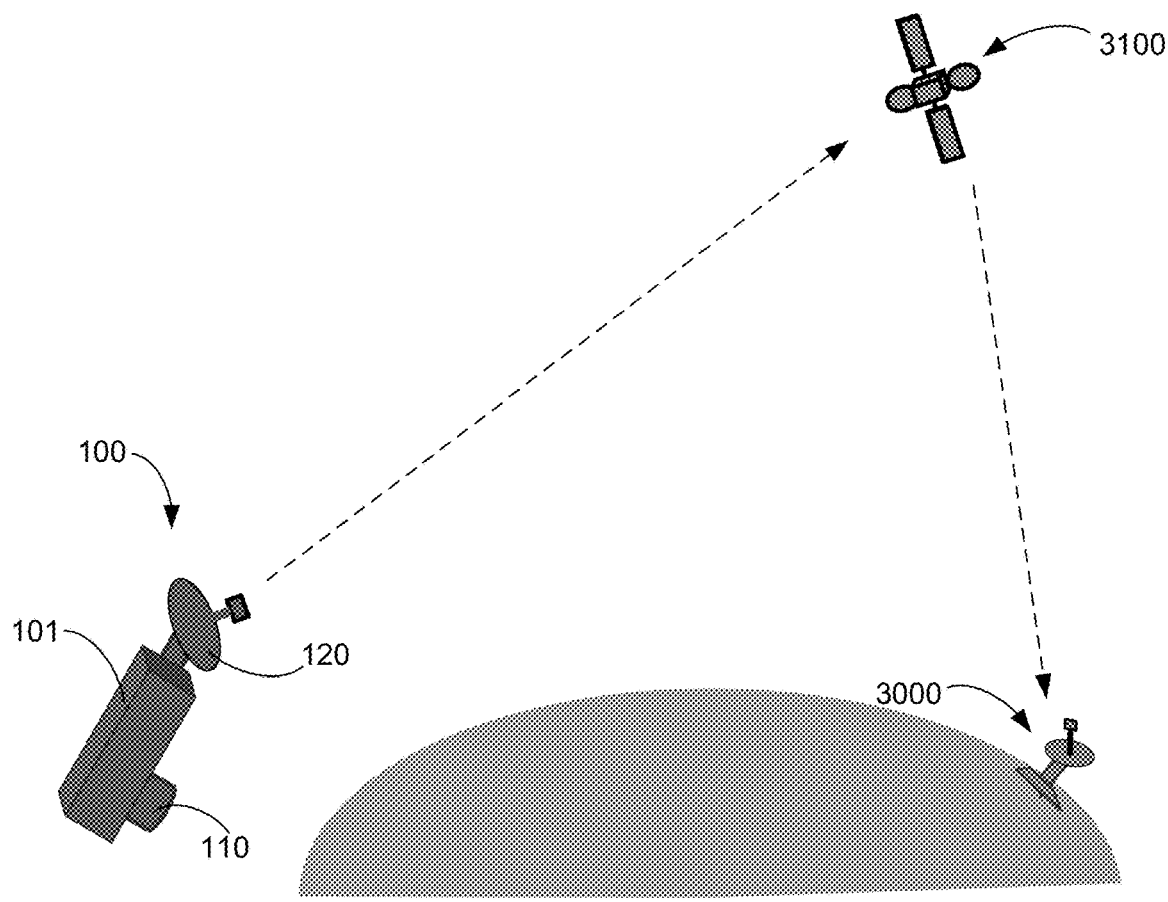
FIG. 3 illustrates a spacecraft and/or the directional antenna reoriented such that the directional antenna is directed toward a second spacecraft, according to an implementation.

Features and benefits of the present invention may be better appreciated by referring now to FIG. 3, which illustrates that during a period of time when the data collection payload is not within view of the region of interest, the spacecraft 100 and/or the directional antenna 120 may be reoriented such that the directional antenna 120 is directed toward a second spacecraft 3100. The second spacecraft 3100 may be disposed in a substantially higher orbit than the LEO spacecraft 100. In some implementations, the spacecraft 3100 may be disposed in a geosynchronous orbit, for example. In such a high altitude orbit, the spacecraft 3100 may be simultaneously within view of a ground station 3000 and the LEO spacecraft 100. Indeed, taking into account the large number of spacecraft distributed around the geosynchronous orbit at diverse longitudinal locations, the LEO spacecraft 100 is likely to be within view of at least one such geosynchronous spacecraft for most if not all of its orbital period. As a result, average latency between data collection to receipt of data by a user can be reduced from one or more hours to less than 10 minutes, for example, in some implementations.

Figure 4:
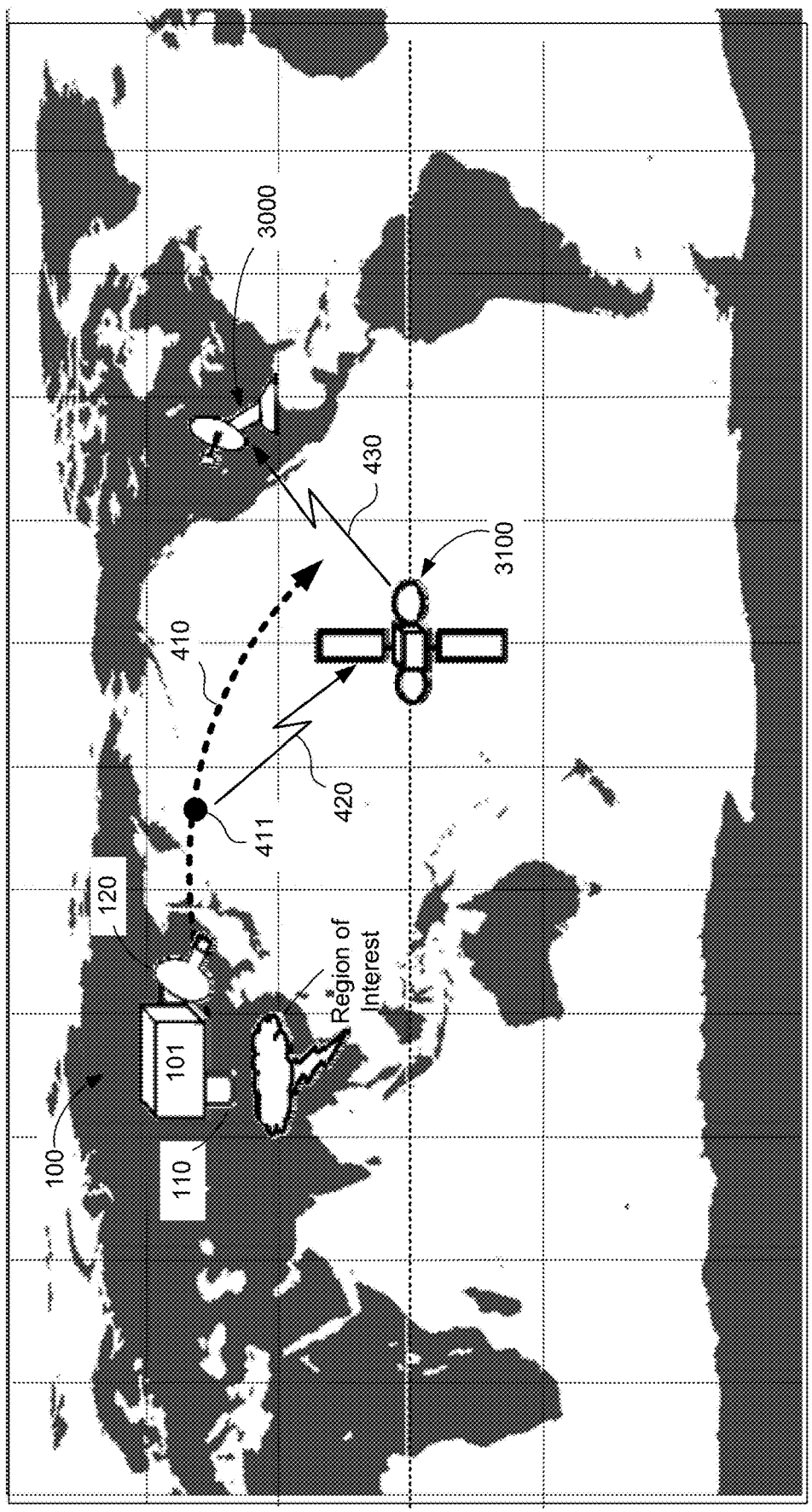
FIG. 4 illustrates an example operational sequence of collecting observational data, according to an implementation.

FIG. 4 illustrates an example operational sequence of collecting observational data, according to an implementation. In the illustrated example, the spacecraft 100 is shown to be proximate to a region of interest, from which observational data may be collected by the data collection payload 110 and stored. As the spacecraft 100 transits along its orbit track 410, the spacecraft 100 moves out of view of the region of interest. At a location 411 along orbit track 410, the spacecraft 100 and/or its directional antenna 120 may be reoriented such that the directional antenna 120 is directed toward the second spacecraft 3100. The directional antenna 120 may then establish a cross-link 420 with the second spacecraft 3100. The stored collected data may then be transmitted to a user on the ground by way of the cross-link 420 and a downlink 430 established between the second spacecraft 3100 and the ground station 3000. Thus, the spacecraft 120 is enabled, by the presently disclosed techniques, to deliver stored collected data to a user on the ground whether or not the spacecraft 120 is itself within direct view of any ground station.

The spacecraft 100 may be reoriented using, thrusters, reaction wheels, magnetic or solar torquers. In some implementations, the spacecraft may incorporate aerodynamic control techniques including those described in U.S. Pat. No. 9,889,950, assigned to the assignee of the present application, and incorporated herein by reference in its entirety. Reorientation of the directional antenna 120 may be accomplished by way of one or more gimbals and/or a two axis or three axis antenna positioning mechanism disposed between the directional antenna 120 and a main body of the spacecraft 100.

The reorientation of the directional antenna 120 may be limited due to its gimbal configuration, preventing tracking of the second spacecraft 3100 under certain circumstances. For example, as described in U.S. Pat. Pub 2007/0241244, a two axis (X-Y) gimbal is vulnerable to the "keyhole problem" during times that the directional antenna is required to be pointed in a direction approximately co-linear with the X or Y axis. The presently disclosed techniques contemplate overcoming the keyhole problem by reorientation of the spacecraft 110 to assure that the gimbal X and Y axes avoid co-linearity with a direction vector toward spacecraft 3100.

Figure 5:
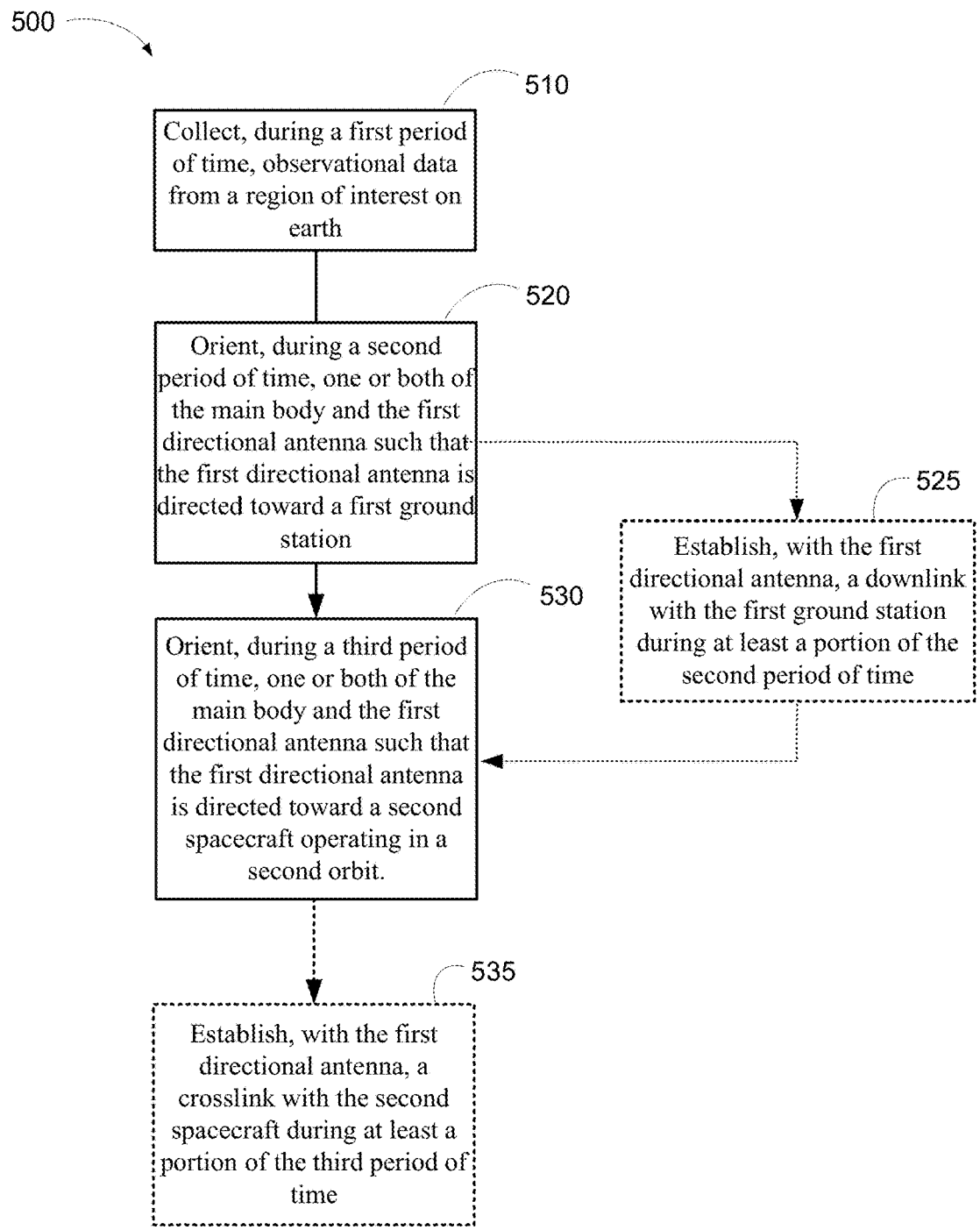
FIG. 5 illustrates a method of operating a LEO spacecraft, according to an implementation.

Referring now to FIG. 5, a method of operating a LEO spacecraft will be described. The method 500 includes a step 510 of collecting, during a first period of time, observational data from a region of interest on earth, using a data collection payload disposed on a low earth orbiting spacecraft (LEO spacecraft) operating in a first earth orbit. As described hereinabove, the LEO spacecraft may include a main body, the data collection payload, and a first directional antenna, each of the data collection payload and the first directional antenna being coupled with the main body.

During a second period of time, at step 520, one or both of the main body and the first directional antenna are oriented such that the first directional antenna is directed toward a first ground station.

During a third period of time, at step 530, one or both of the main body and the first directional antenna are oriented such that the first directional antenna is directed toward a second spacecraft operating in a second orbit.

Optionally, the method 500 may include a step 525 of establishing, with the first directional antenna, a downlink with the first ground station during at least a portion of the second period of time, and/or a step 535 of establishing, with the first directional antenna, a crosslink with the second spacecraft during at least a portion of the third period of time.

Thus, techniques for providing low-latency transmission of imaging data from a first satellite in a low earth orbit to a ground station via a second satellite in a higher earth orbit, using a downlink antenna on the first spacecraft to establish an inter-satellite link ("crosslink") with the second satellite been described. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A low earth orbiting spacecraft (LEO spacecraft) operable in a first earth orbit, the LEO spacecraft comprising:
a main body, a data collection payload, and a first directional antenna, each of the data collection payload and the first directional antenna being coupled with the main body, wherein:
during a first period of time, the main body is oriented such that the data collection payload views a region of interest on the earth;
during a second period of time, the main body and the first directional antenna are oriented such that the first directional antenna is directed toward a first ground station;

during a third period of time, the main body and the first directional antenna are oriented such that the first directional antenna is directed toward a second spacecraft operating in a second orbit; and an orientation of the first directional antenna with respect to the main body is controlled by a gimbal rotatable about an X axis and a Y axis and the main body is oriented to avoid co-linearity between a direction toward the second spacecraft and each of the X axis and the Y axis.

2. The LEO spacecraft of claim 1, wherein the first directional antenna is configured to establish a downlink with the first ground station during at least a portion of the second period of time and is configured to establish a crosslink with the second spacecraft during at least a portion of the third period of time.

3. The LEO spacecraft of claim 2, wherein the LEO spacecraft is configured to transmit data collected by the data collection payload by way of the crosslink to the second spacecraft.

4. The LEO spacecraft of claim 2, wherein data collected by the data collection payload is forwarded to a second ground station by way of the crosslink to the second spacecraft and a downlink from the second spacecraft to the second ground station.

5. The LEO spacecraft of claim 1, wherein at least a portion of the second period of time overlaps with at least a portion of the first period of time.

6. The LEO spacecraft of claim 1, wherein the third period of time overlaps no portion of the first period of time and no portion of the second period of time.

7. The LEO spacecraft of claim 1, wherein the first directional antenna is a steerable dish antenna.

8. The LEO spacecraft of claim 1, wherein the second orbit is substantially higher than the first earth orbit.

9. The LEO spacecraft of claim 1, wherein the second orbit is a geosynchronous orbit.

10. A method, comprising:
collecting, during a first period of time, observational data from a region of interest on earth, using a data collection payload disposed on a low earth orbiting spacecraft (LEO spacecraft) operating in a first earth orbit, the LEO spacecraft including a main body, the data collection payload, and a first directional antenna, each of the data collection payload and the first directional antenna being coupled with the main body;

orienting, during a second period of time, one or both of the main body and the first directional antenna such that the first directional antenna is directed toward a first ground station; and orienting, during a third period of time, one or both of the main body and the first directional antenna such that the first directional antenna is directed toward a second spacecraft operating in a second orbit; wherein:

an orientation of the first directional antenna with respect to the main body is controlled by a gimbal rotatable about an X axis and a Y axis and the main body is oriented to avoid co-linearity between a direction toward the second spacecraft and each of the X axis and the Y axis.

11. The method of claim 10, further comprising:
establishing, with the first directional antenna, a downlink with the first ground station during at least a portion of the second period of time; and establishing, with the first directional antenna, a crosslink with the second spacecraft during at least a portion of the third period of time.

12. The method of claim 11, further comprising transmitting data collected by the data collection payload by way of the crosslink to the second spacecraft.

13. The method of claim 11, wherein data collected by the data collection payload is forwarded to a second ground station by way of the crosslink to the second spacecraft and a downlink from the second spacecraft to the second ground station.

14. The method of claim 10, wherein at least a portion of the second period of time overlaps with at least a portion of the first period of time.

15. The method of claim 10, wherein the third period of time overlaps no portion of the first period of time and no portion of the second period of time.

16. The method of claim 10, wherein the first directional antenna is a steerable dish antenna.

17. The method of claim 10, wherein the second orbit is substantially higher than the first earth orbit.

18. The method of claim 10, wherein the second orbit is a geosynchronous orbit.

* * * * *